(12) United States Patent
Tang

(10) Patent No.: US 12,447,104 B1
(45) Date of Patent: Oct. 21, 2025

(54) DRUG STORAGE CONTAINER COVER WITH TEMPERATURE DETECTION FUNCTION

(71) Applicant: Ruichan Tang, Zhengzhou (CN)

(72) Inventor: Ruichan Tang, Zhengzhou (CN)

( * ) Notice: Subject to any disclaimer, the term of this patent is extended or adjusted under 35 U.S.C. 154(b) by 0 days.

(21) Appl. No.: 19/055,746

(22) Filed: Feb. 18, 2025

(51) Int. Cl.
*A61J 1/14* (2023.01)
*G01K 1/024* (2021.01)
*G01K 1/14* (2021.01)

(52) U.S. Cl.
CPC ............ *A61J 1/1418* (2015.05); *G01K 1/024* (2013.01); *G01K 1/14* (2013.01); *A61J 2200/72* (2013.01)

(58) Field of Classification Search
CPC .... A61J 1/1418; A61J 2200/72; G01K 1/024; G01K 1/14
See application file for complete search history.

(56) References Cited

U.S. PATENT DOCUMENTS

| | | | | |
|---|---|---|---|---|
| 2013/0256331 | A1* | 10/2013 | Giraud | A61J 1/03 221/277 |
| 2014/0266760 | A1* | 9/2014 | Burke, Jr. | G16H 20/13 340/687 |
| 2020/0179233 | A1* | 6/2020 | Venti | A61J 9/085 |

FOREIGN PATENT DOCUMENTS

| CN | 101352297 A | * | 1/2009 |
|---|---|---|---|
| CN | 209678087 U | * | 11/2019 |

* cited by examiner

*Primary Examiner* — John E Breene
*Assistant Examiner* — Janice M Soto

(57) ABSTRACT

A drug storage container cover with a temperature detection function includes a cup cover main body. The cup cover main body is provided with an accommodating cavity. A temperature display device and a power supply device are installed inside the accommodating cavity. The power supply device is detachably connected to the temperature display device. The drug storage container cover further includes a temperature detection probe. The temperature detection probe is arranged inside the accommodating cavity and extends towards an outer portion of the cup cover main body. The temperature detection probe and the temperature display device are both electrically connected to the power supply device.

16 Claims, 13 Drawing Sheets

DRUG STORAGE CONTAINER COVER WITH TEMPERATURE DETECTION FUNCTION

TECHNICAL FIELD

The present invention relates to the field of storage containers, particularly to a drug storage container cover with a temperature detection function.

BACKGROUND ART

With the development of society, the prosperity of the economy, and the improvement of living standards, drug storage containers have become indispensable items in people's lives. Existing drug storage containers usually have a temperature monitoring function and a real-time temperature display function, allowing users to intuitively understand and control the storage temperature of drugs. However, when power supply devices (such as batteries) of these containers are exhausted, users usually need to replace the entire cup cover or container, which not only increases the cost of use, but also causes unnecessary resource waste and time consumption.

In order to solve the above problem, a drug storage container cover with a temperature detection function is provided in the present invention. Users can easily disassemble and replace the power supply device with a new one without replacing the entire cup cover, thereby saving costs and time.

SUMMARY

In order to overcome the shortcomings of the prior art, a drug storage container cover with a temperature detection function is provided in the present invention. A user can easily disassemble and replace a power supply device with a new one without replacing an entire cup cover, thereby saving costs and time, and effectively improving a service life of the cup cover.

A technical solution adopted by the present invention to solve its technical problem is as follows.

A drug storage container cover with a temperature detection function is provided in the present invention, including a cup cover main body. The cup cover main body is provided with an accommodating cavity. A temperature display device and a power supply device are installed inside the accommodating cavity. The power supply device is detachably connected to the temperature display device. The drug storage container cover further includes a temperature detection probe. The temperature detection probe is arranged inside the accommodating cavity and extends towards an outer portion of the cup cover main body. The temperature detection probe and the temperature display device are both electrically connected to the power supply device.

As an improvement of the present invention, an installation seat is provided inside the accommodating cavity. The installation seat is provided with an installation chamber. The temperature display device is installed inside the installation chamber.

As an improvement of the present invention, the temperature display device includes a circuit board and a display module electrically connected to the circuit board. The power supply device is detachably connected to the circuit board.

As an improvement of the present invention, the installation seat also includes an installation slot. The installation slot is defined below the installation seat. The power supply device is detachably installed in the installation slot and is electrically connected to the circuit board.

As an improvement of the present invention, a bottom portion of the installation seat is provided with at least two position limiting columns. One end of the position limiting column is connected to the bottom portion of the installation seat, and an opposite end of the position limiting column is provided with a position limiting engaging block. At least two of the position limiting columns surround and form the installation slot. The position limiting engaging block is used for clamping the power supply device in the installation slot. The position limiting column is an elastic position limiting column.

As an improvement of the present invention, the bottom portion of the installation seat is also provided with at least one installation blocking plate. The position limiting columns and the installation blocking plate surround and form the installation slot.

As an improvement of the present invention, a plurality of clamping blocks are provided on a cavity wall of the accommodating cavity. The clamping blocks are used for clamping the installation seat inside the accommodating cavity.

As an improvement of the present invention, a display cover for displaying a temperature value is provided on the circuit board. A first gap is defined between the display cover and the circuit board.

As an improvement of the present invention, the first gap is filled with a colloid.

As an improvement of the present invention, the drug storage container cover further includes an upper cover detachably connected to the cup cover main body. The upper cover is connected to the cup cover main body to form a sealed cavity. The temperature display device is installed inside the sealed cavity.

As an improvement of the present invention, a first connecting portion is provided on an outer wall surface of the cup cover main body. A second connecting portion is provided on an inner wall surface of the upper cover. The first connecting portion cooperates with the second connecting portion to allow the upper cover to be detachably connected to the cup cover main body.

As an improvement of the present invention, the cup cover main body includes a first outer side wall and a first inner side wall. A first groove is defined between the first outer side wall and the first inner side wall. The upper cover includes a second outer side wall and a second inner side wall. A second groove is defined between the second outer side wall and the second inner side wall. The first connecting portion is provided on an outer wall surface of the first outer side wall, the second connecting portion is provided on an inner wall surface of the second outer side wall, the first outer side wall is provided in the second groove, and the second inner side wall is provided in the first groove, so that the first connecting portion and the second connecting portion cooperate to allow the upper cover to be detachably connected with the cup cover main body.

As an improvement of the present invention, a first sealing ring is also provided between the second inner side wall and the first groove.

As an improvement of the present invention, a central hole is defined in the upper cover. The installation seat is installed inside the sealed cavity and extends outward through the central hole, and an upper surface of the installation seat is flush with an upper surface of the upper cover.

As an improvement of the present invention, a first through hole is defined in a bottom end of the cup cover main body. The first through hole is in communication with the accommodating cavity to allow the temperature detection probe to pass through the first through hole from an inner portion of the accommodating cavity and extend towards an outer portion of the cup cover main body.

As an improvement of the present invention, the cup cover main body further includes a flange formed by a protruding portion of the accommodating cavity. A bottom portion of the flange is provided with a lower cover plate. A second through hole is defined in the lower cover plate. The temperature detection probe is inserted into the second through hole and extends toward the outer portion of the cup cover main body.

As an improvement of the present invention, a second gap is defined between the first through hole and the second through hole. A second sealing ring is provided inside the second gap to seal the first through hole, the second through hole, and the temperature detection probe.

As an improvement of the present invention, a sinking slot is defined in a bottom portion of the flange. The lower cover plate is provided with a first installation portion and a second installation portion. The second installation portion is connected with the first installation portion. The first installation portion is a plastic installation portion, and the second installation portion is a stainless steel installation portion. The first installation portion is disposed in the sinking slot, so that the lower cover plate is connected with the flange.

As an improvement of the present invention, an outer side wall of the cup cover main body is also provided with a first decorative cover. An outer side wall of the upper cover is provided with a second decorative cover. Both the first decorative cover and the second decorative cover are metal decorative covers.

As an improvement of the present invention, a cavity wall of the accommodating cavity is provided with an installation slot opening. The temperature display device is installed in the installation slot opening. The temperature display device is equipped with an electrical compartment, and the power supply device is installed inside the electrical compartment, so that the power supply device is detachably connected to the temperature display device.

Beneficial effects of the present invention are as follows. The drug storage container cover with the temperature detection function includes the cup cover main body. The cup cover main body is provided with an accommodating cavity. The temperature display device and the power supply device are installed inside the accommodating cavity. The power supply device is detachably connected to the temperature display device. The drug storage container cover further includes the temperature detection probe. The temperature detection probe is arranged inside the accommodating cavity and extends towards the outer portion of the cup cover main body. The temperature detection probe and the temperature display device are both electrically connected to the power supply device. The power supply device is detachably connected to the temperature display device, which facilitates replacement and maintenance of a battery, extends a service life of the drug storage container cover, and ensures quick replacement in case of failure of the temperature display device.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
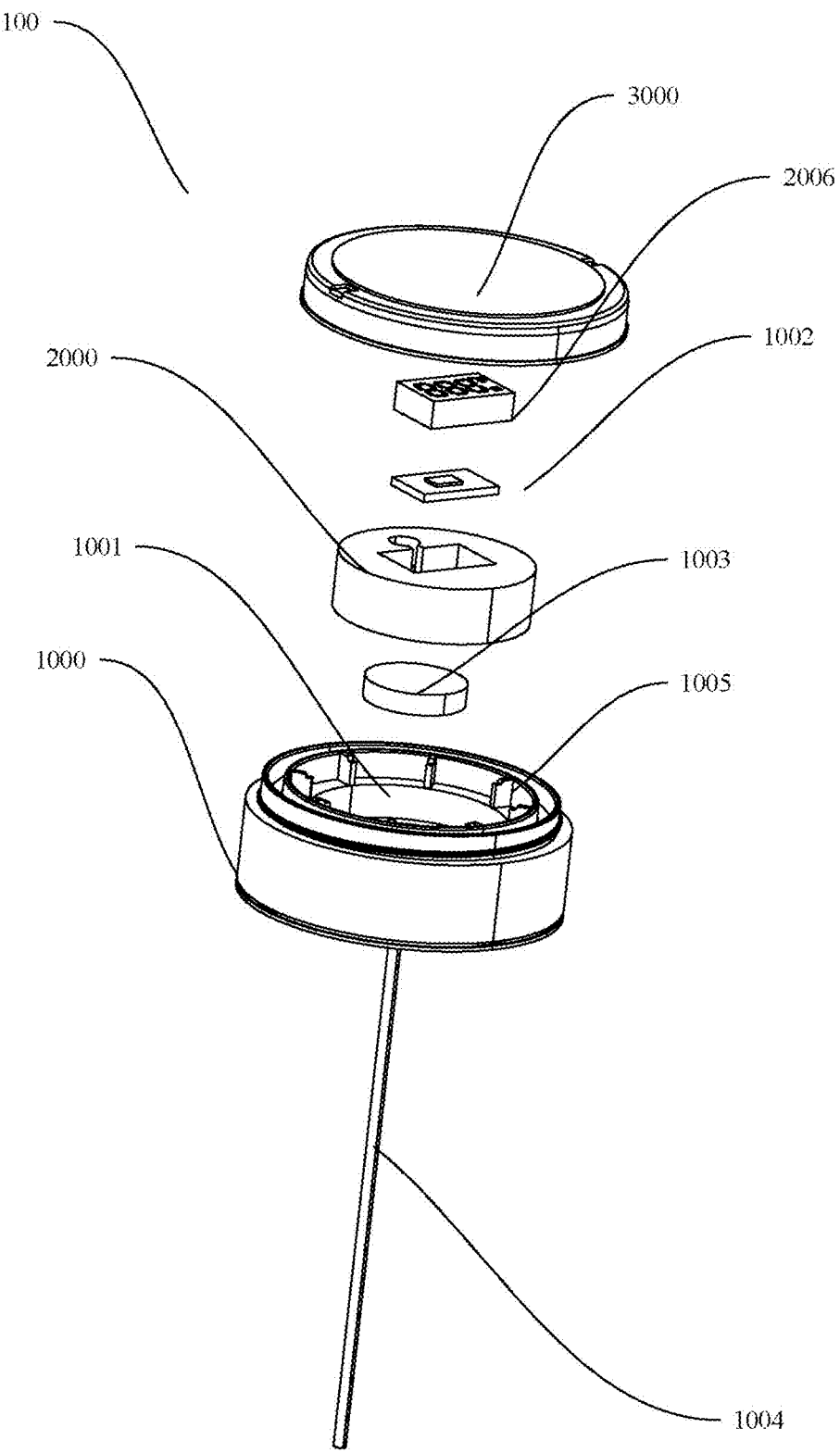
FIG. 1 is a schematic diagram of an overall structure of embodiment one of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-11, a drug storage container cover 100 with a temperature detection function disclosed in the present invention includes a cup cover main body 1000. The cup cover main body 1000 is provided with an accommodating cavity 1001. A temperature display device 1002 and a power supply device 1003 are installed inside the accommodating cavity 1001. The power supply device 1003 is detachably connected to the temperature display device 1002. The drug storage container cover 100 further includes a temperature detection probe 1004. The temperature detection probe 1004 is arranged inside the accommodating cavity 1001 and extends towards an outer portion of the cup cover main body 1000. The temperature detection probe 1004 and the temperature display device 1002 are both electrically connected to the power supply device 1003. By providing the temperature display device 1002, a user can intuitively view a current temperature without opening a container, greatly facilitating the monitoring and management of a drug storage environment. Moreover, the power supply device 1003 is detachably connected to the temperature display device 1002, which facilitates replacement and maintenance of a battery, extends a service life of the drug storage container cover, and ensures quick replacement in case of failure of the temperature display device 1002.

As a preferred option, the power supply device 1003 of this embodiment is a button battery. The button battery has a small volume and can effectively reduce the space occupation inside the drug storage container cover, making the design of the drug storage container cover more lightweight and simple. Moreover, compared with other battery types, the button battery has a lower cost, reducing an overall manufacturing cost of the product.

Figure 2:
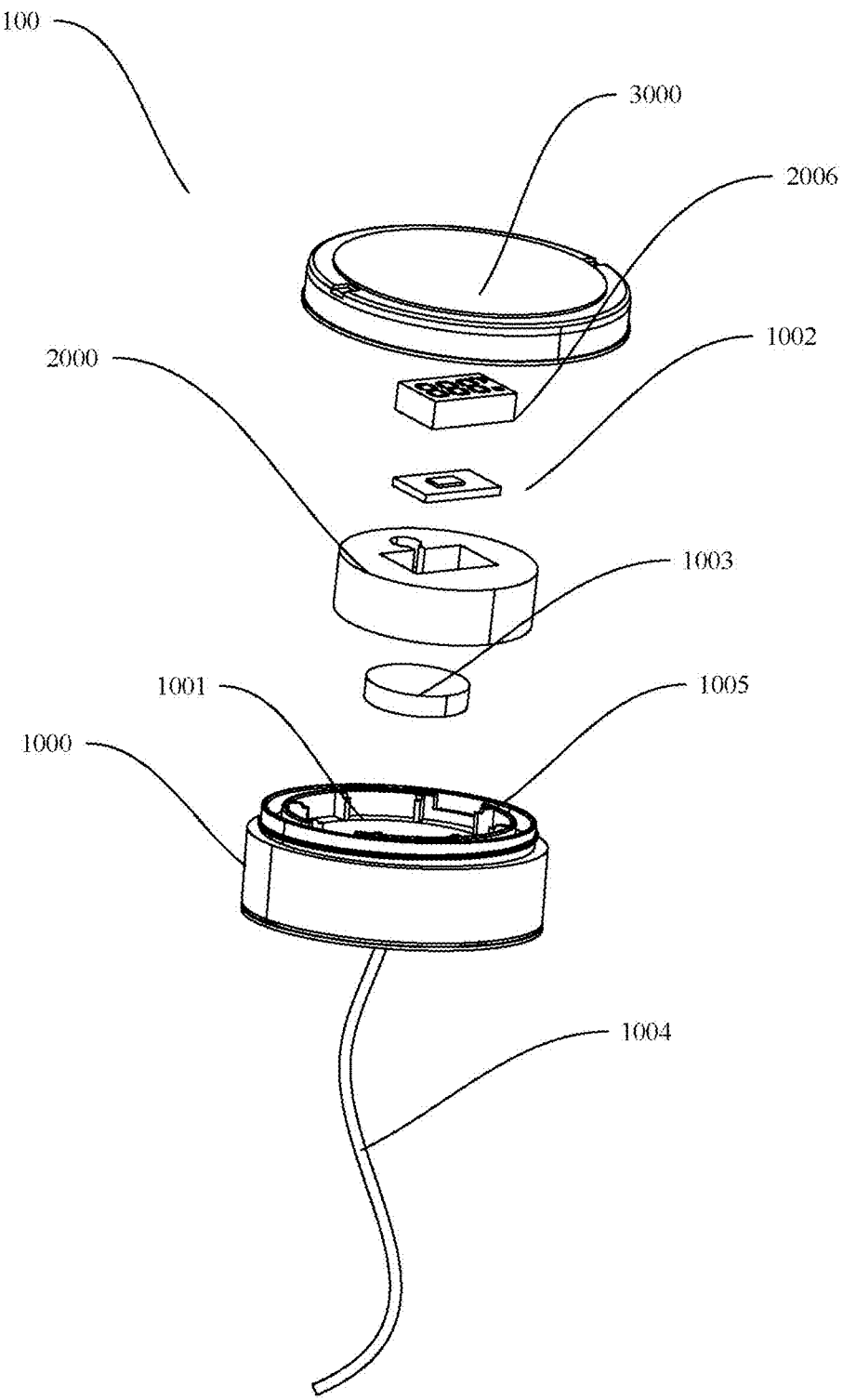
FIG. 2 is a schematic diagram of a structure of another embodiment of a temperature detection probe in the present invention.
Figure 3:
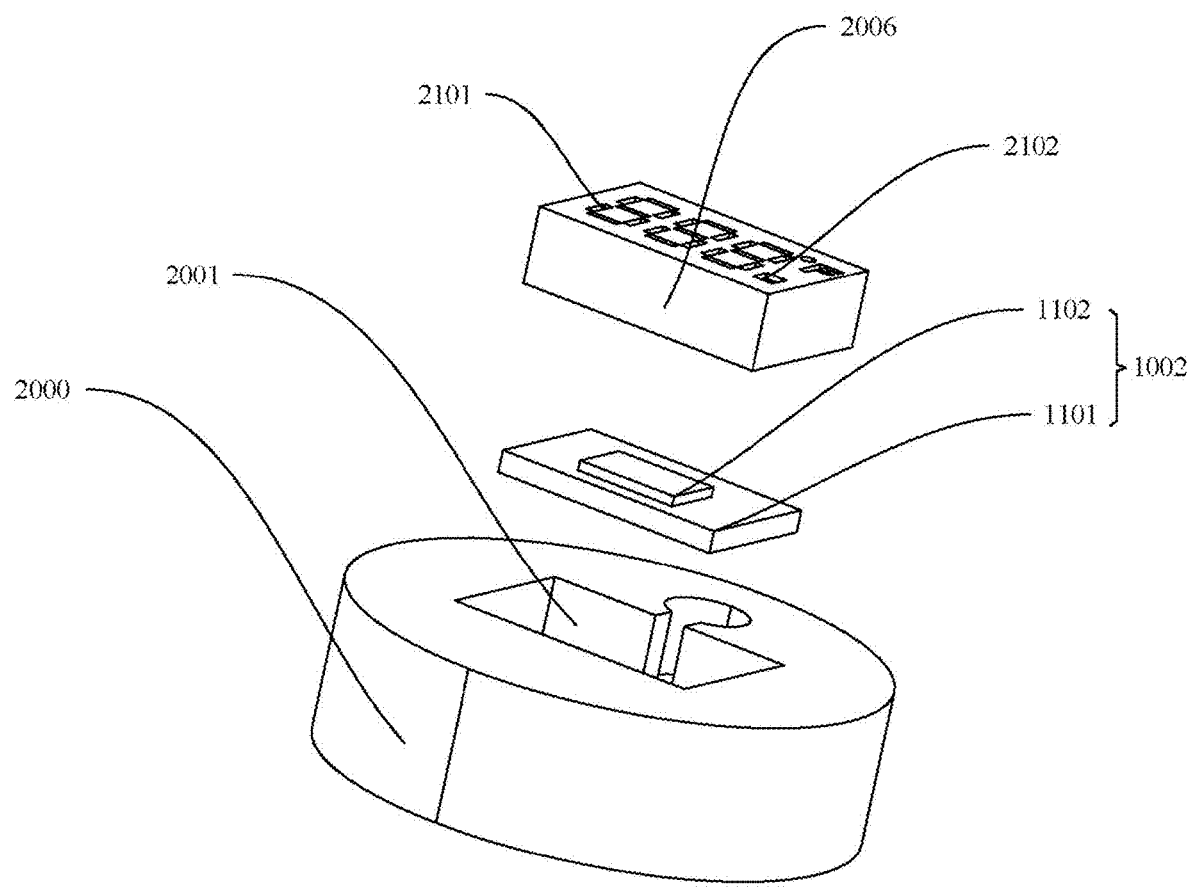
FIG. 3 is a schematic diagram of an exploded structure of connection between an installation seat and a temperature display device in the present invention.
Figure 4:
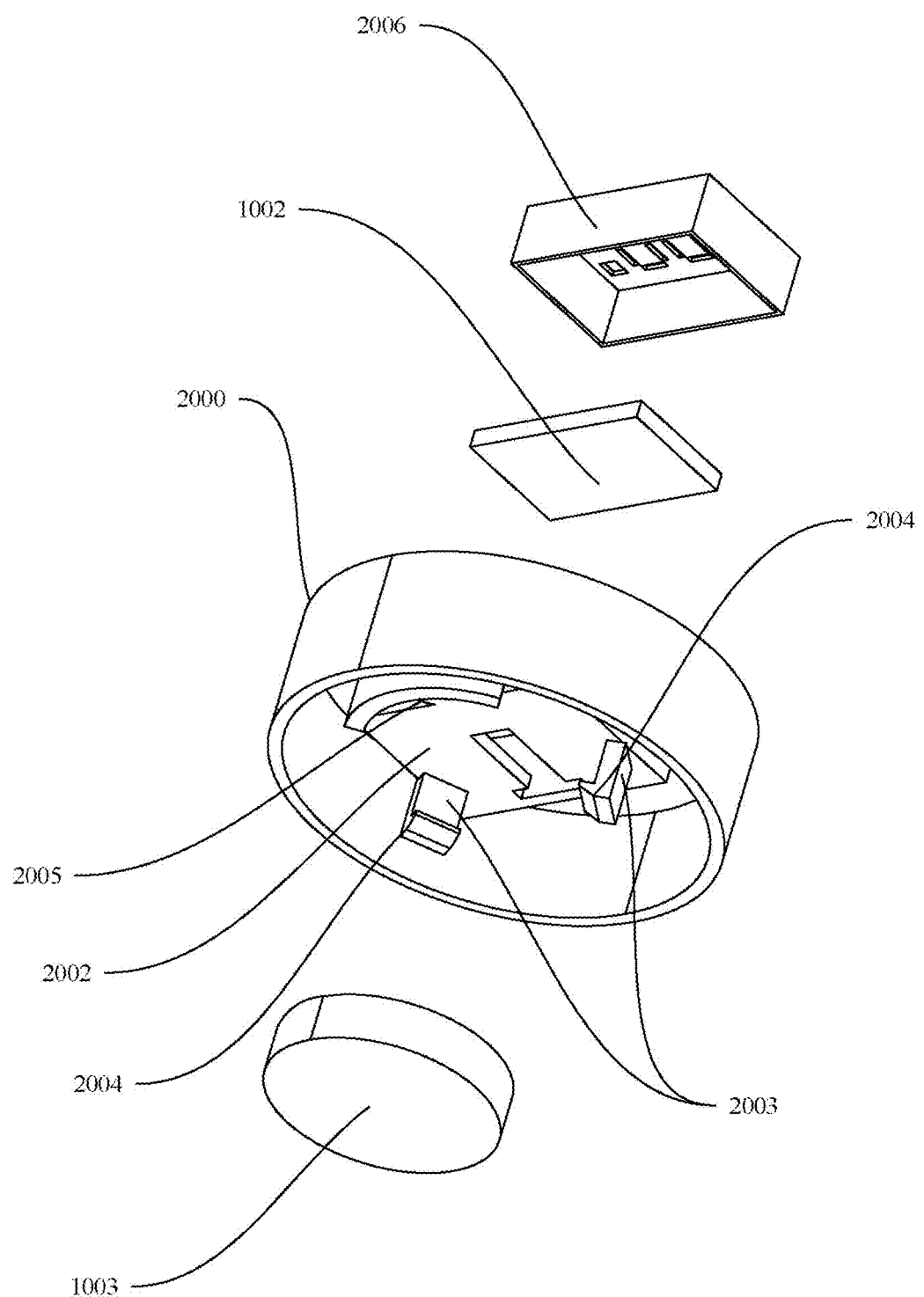
FIG. 4 is a schematic diagram of an exploded structure of connection between an installation seat and a power supply device in the present invention.

As a preferred option, as shown in FIG. 1 and FIG. 2, the temperature detection probe 1004 is a temperature detection line or a probing pin, and the user can choose an appropriate installation method according to an actual need, which has strong adaptability. Meanwhile, this embodiment is applicable to different types of drug storage containers, such as bottles, cans, etc., with a wide range of applications.

As a first embodiment of the present invention, in this embodiment, an installation seat 2000 is provided inside the accommodating cavity 1001. The installation seat 2000 is provided with an installation chamber 2001. The temperature display device 1002 is installed inside the installation chamber 2001. Installing the temperature display device 1002 in the installation chamber 2001 can provide additional protection for the temperature display device 1002, avoiding direct damage caused by an external environment, and improving the service life of the drug storage container cover.

In this embodiment, the temperature display device 1002 includes a circuit board 1101 and a display module 1102 electrically connected to the circuit board 1101. The power supply device 1003 is detachably connected to the circuit board 1101.

Specifically, the installation seat 2000 also includes an installation slot 2002. The installation slot 2002 is defined below the installation seat 2000. The power supply device 1003 is detachably installed in the installation slot 2002 and is electrically connected to the circuit board 1101. The power supply device 1003 is fixed in the installation slot 2002, which can prevent the battery from loosening or poor contact due to vibration or movement. The installation slot 2002 is designed below the installation seat 2000, making reasonable use of a space of the installation seat 2000, and making an overall structure more compact without affecting other functions of the drug storage container cover.

As one of the embodiments, a bottom portion of the installation seat 2000 is provided with at least two position limiting columns 2003. One end of the position limiting column 2003 is connected to the bottom portion of the installation seat 2000, and an opposite end of the position limiting column 2003 is provided with a position limiting engaging block 2004. At least two of the position limiting columns 2003 surround and form the installation slot 2002. The position limiting engaging block 2004 is used for clamping the power supply device 1003 in the installation slot 2002. With the above structure, the power supply device 1003 can be firmly fixed in the installation slot 2002 through the combination of the position limiting column 2003 and the position limiting engaging block 2004, preventing loosening and displacement, and ensuring the continuity and stability of power supply.

In this embodiment, the position limiting column 2003 is an elastic position limiting column 2003. The elastic position limiting column 2003 makes the installation and disassembly of the power supply device 1003 easier, without a need for additional tools, and the user can easily perform replacement and maintenance.

As another embodiment, the bottom portion of the installation seat 2000 is also provided with at least one installation blocking plate 2005. The position limiting columns 2003 and the installation blocking plate 2005 surround and form the installation slot 2002. The installation blocking plate 2005 and the position limiting columns 2003 jointly surround and form the installation slot 2002, allowing the power supply device 1003 to be tightly fixed in the installation slot 2002, optimizing an internal space layout and making the overall structure more compact and tidy.

In this embodiment, the bottom portion of the installation seat 2000 is provided with two position limiting columns 2003 and one installation blocking plate 2005, and the installation blocking plate 2005 of this embodiment has an arc-shaped structure adapted to the power supply device 1003, so that the two position limiting columns 2003 and one installation blocking plate 2005 surround and form the circular installation slot 2002 for the installation of the power supply device 1003. In other embodiments, a total number of the position limiting columns 2003 and a total number of the installation blocking plate 2005 can be configured in any desired quantity.

In this embodiment, a plurality of clamping blocks 1005 are provided on a cavity wall of the accommodating cavity 1001. The clamping blocks 1005 are used for clamping the installation seat 2000 inside the accommodating cavity 1001, preventing the installation seat 2000 from moving or loosening inside the accommodating cavity 1001, and avoiding device failure caused by vibration or movement during use.

In this embodiment, a display cover 2006 for displaying a temperature value is provided on the circuit board 1101. A first gap 2007 is defined between the display cover 2006 and the circuit board 1101. The first gap 2007 is filled with a colloid. The colloid is an adhesive. The colloid is configured for gluing and sealing the display cover 2006 and the circuit board 1101, effectively preventing moisture and dust from entering the circuit board 1101, protecting internal electronic components, and improving the durability and reliability of the device.

In this embodiment, the display cover 2006 is provided with a plurality of through strip-shaped holes 2101. The plurality of strip-shaped holes 2101 are arranged in an "8" shape. The circuit board 1101 is equipped with a light emitting LED. When the LED emits light, the light passes through the strip-shaped holes 2101. Different light emitting LEDs are combined to emit light, and different numbers may be displayed. The display cover 2006 is also provided with a plurality of square holes 2102, which can be used to display other elements such as Bluetooth, electric quantity, etc.

In this embodiment, the drug storage container cover 100 further includes an upper cover 3000 detachably connected to the cup cover main body 1000. The upper cover 3000 is connected to the cup cover main body 1000 to form a sealed cavity 3001. The temperature display device 1002 is installed inside the sealed cavity 3001. The upper cover 3000 is detachably connected to the cup cover main body 1000, making the installation and removal of the temperature display device 1002 simpler and easier for the user to maintain and replace. As a preferred option in this embodiment, the upper cover 3000 is a transparent upper cover, allowing the user to more intuitively see a displayed temperature value.

In this embodiment, a first connecting portion 1006 is provided on an outer wall surface of the cup cover main body 1000. A second connecting portion 3002 is provided on an inner wall surface of the upper cover 3000. The first connecting portion 1006 cooperates with the second connecting portion 3002 to allow the upper cover 3000 to be detachably connected to the cup cover main body 1000.

Specifically, the cup cover main body 1000 includes a first outer side wall 1201 and a first inner side wall 1202. A first groove 1203 is defined between the first outer side wall 1201 and the first inner side wall 1202. The upper cover 3000 includes a second outer side wall 3101 and a second inner side wall 3102. A second groove 3103 is defined between the second outer side wall 3101 and the second inner side wall 3102. The first connecting portion 1006 is provided on an outer wall surface of the first outer side wall 1201, the second connecting portion 3002 is provided on an inner wall surface of the second outer side wall 3101, the first outer side wall 1201 is provided in the second groove 3103, and the second inner side wall 3102 is provided in the first groove 1203, so that the first connecting portion 1006 and the second connecting portion 3002 cooperate to allow the upper cover 3000 to be detachably connected with the cup cover main body 1000. In the above structure, the first outer side wall 1201 is arranged in the second groove 3103, and the second inner side wall 3102 is arranged in the first groove 1203. This nested structure not only makes the connection tighter, but also enhances the stability of the overall structure, preventing loosening and displacement.

In this embodiment, a first sealing ring 3104 is also provided between the second inner side wall 3102 and the first groove 1203. The first sealing ring 3104 can effectively fill a gap between the second inner side wall 3102 and the first groove 1203, preventing liquid leakage and improving the sealing performance of the drug storage container cover.

As a preferred option, the first connecting portion 1006 is provided with external threads, and the second connecting portion 3002 is provided with internal threads. The first connecting portion 1006 and the second connecting portion 3002 are connected by threads, allowing the upper cover 3000 to be detachably connected to the cup cover main body 1000. Threaded connection can provide a relatively high fastening force, making the connection between the upper cover 3000 and the cup cover main body 1000 more stable, avoiding loosening or detachment due to vibration or impact during use. Moreover, the detachable connection through threads allows for easy disassembly and installation of the upper cover 3000 and the cup cover main body 1000.

In other embodiments, a plurality of engaging buckles are provided on the first connecting portion 1006, and engaging slots corresponding to the engaging buckles are defined in the second connecting portion 3002. The first connecting portion 1006 and the second connecting portion 3002 are connected by the engaging buckles and the engaging slots, allowing the upper cover 3000 to be detachably connected to the cup cover main body 1000.

Figure 5:
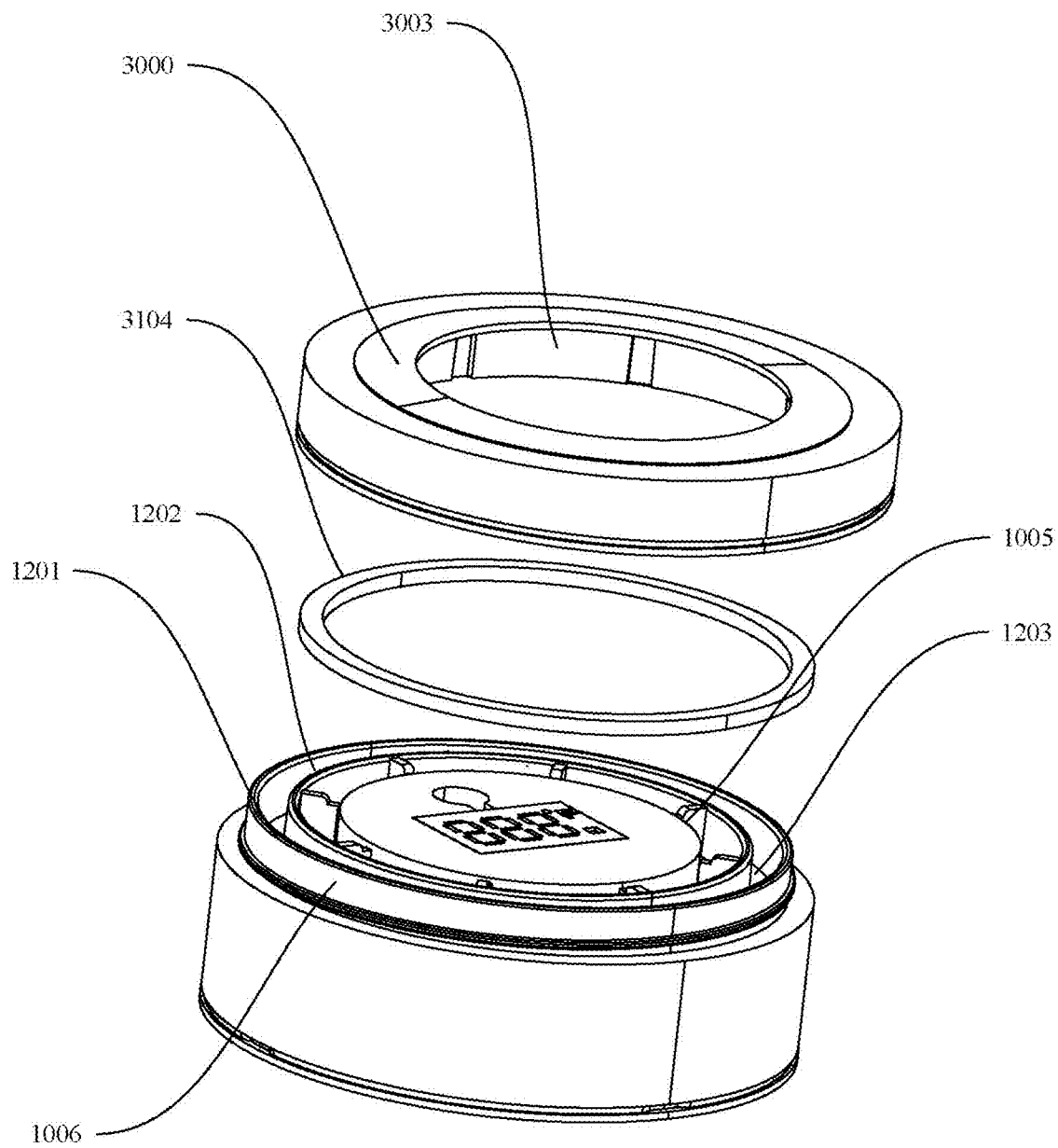
FIG. 5 is a schematic diagram of an exploded structure of connection between an upper cover and a cup cover main body in the present invention.

In this embodiment, as shown in FIG. 5, a central hole 3003 is defined in the upper cover 3000. The installation seat 2000 is installed inside the sealed cavity 3001 and extends outward through the central hole 3003, and an upper surface of the installation seat 2000 is flush with an upper surface of the upper cover 3000. An overall appearance of the drug storage container cover is made cleaner and more beautiful, and a visual effect of the product is enhanced.

Figure 6:
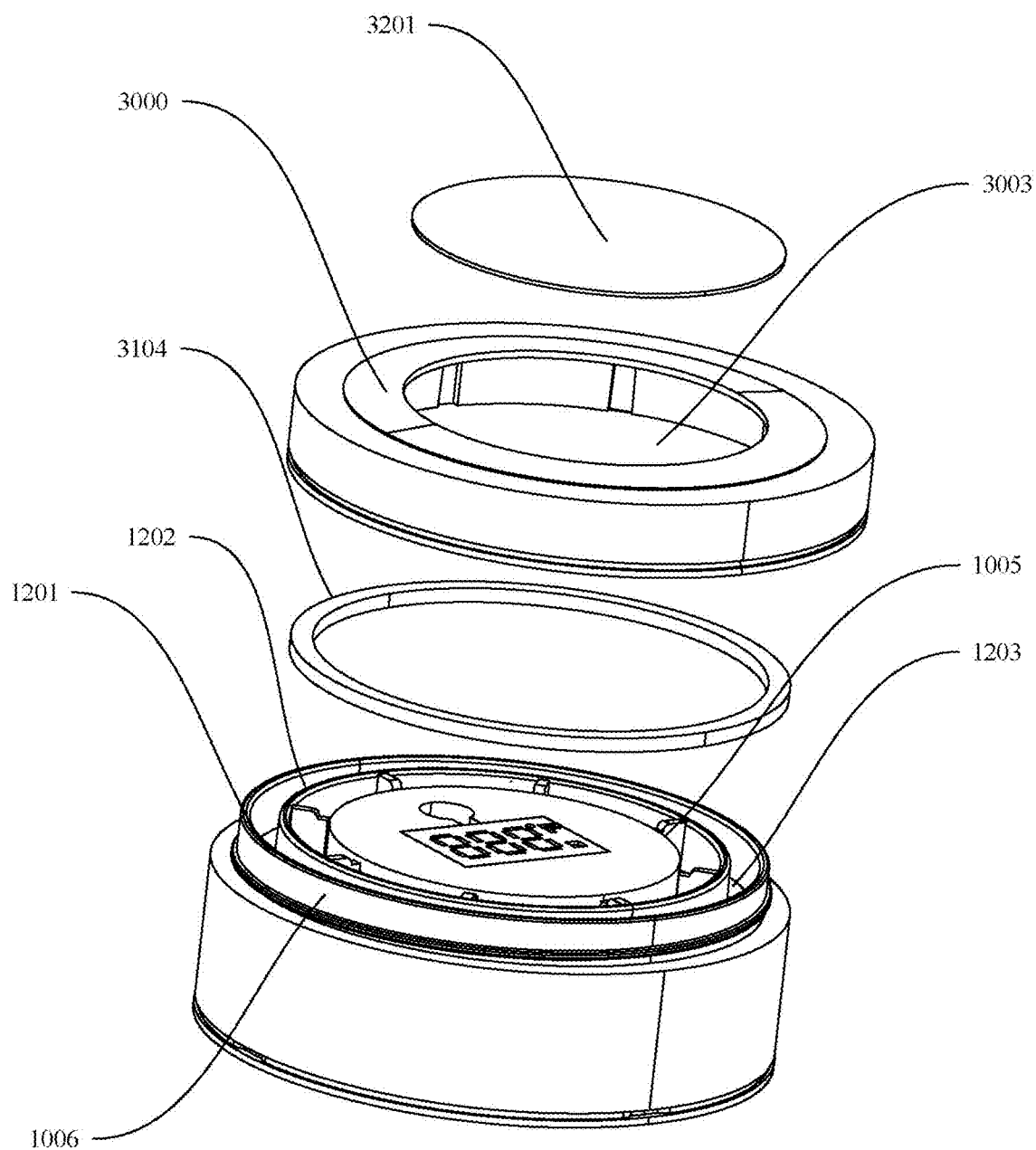
FIG. 6 is a schematic diagram of an exploded structure of another embodiment of an upper cover in the present invention.
Figure 7:
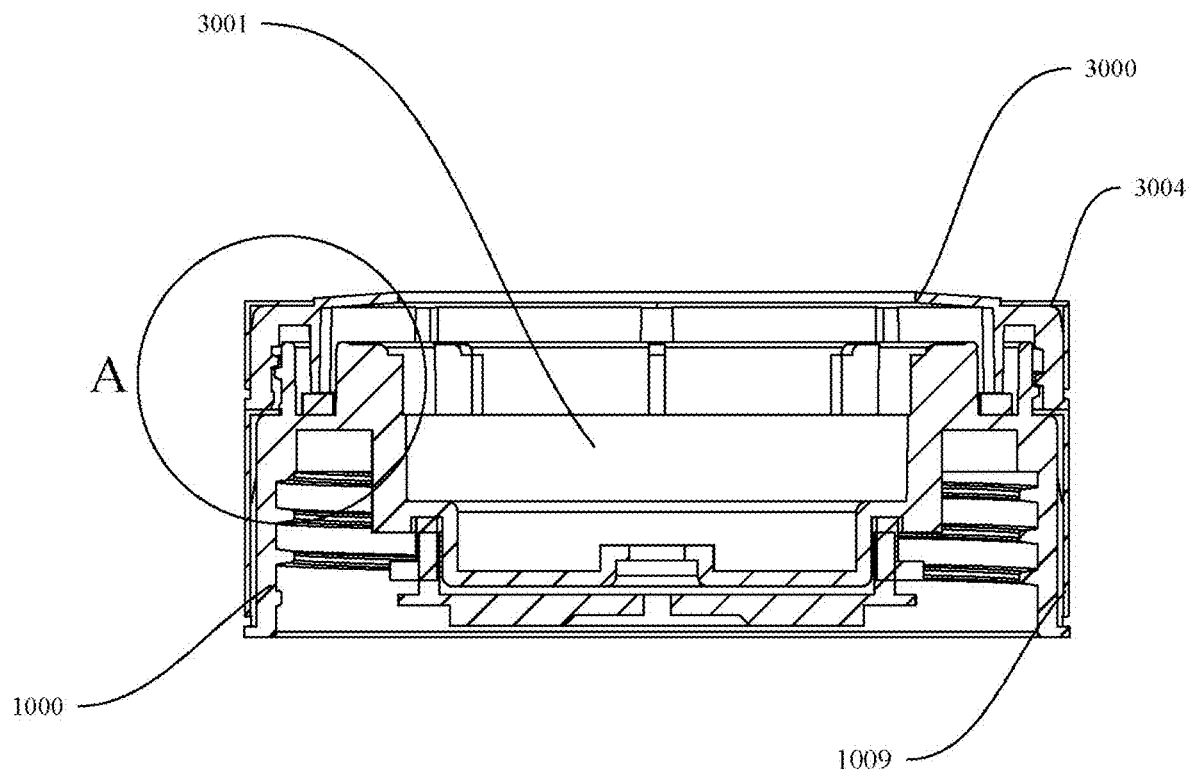
FIG. 7 is a schematic diagram of a cross-sectional structure of connection between an upper cover and a cup cover main body in the present invention.
Figure 8:
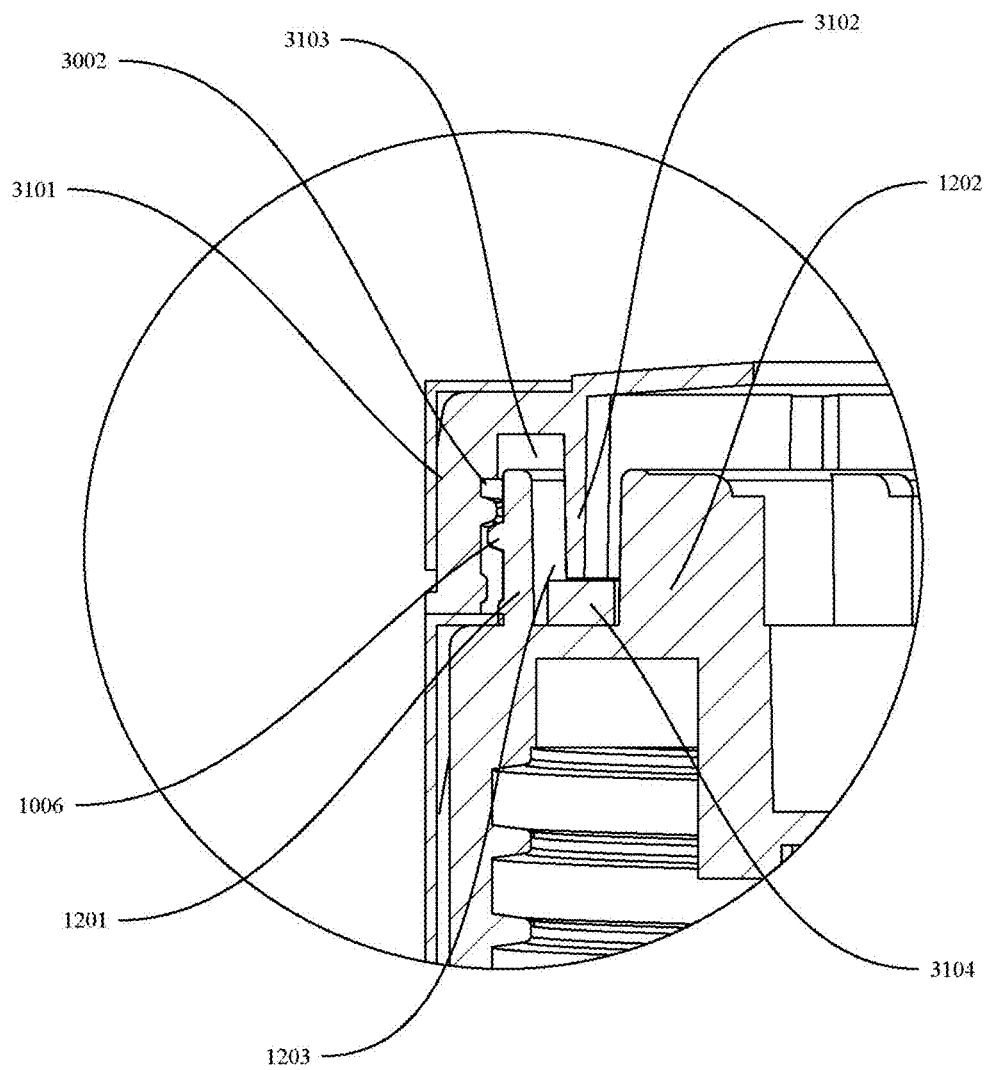
FIG. 8 is an enlarged schematic diagram of a structure of part A in FIG. 7.
Figure 9:
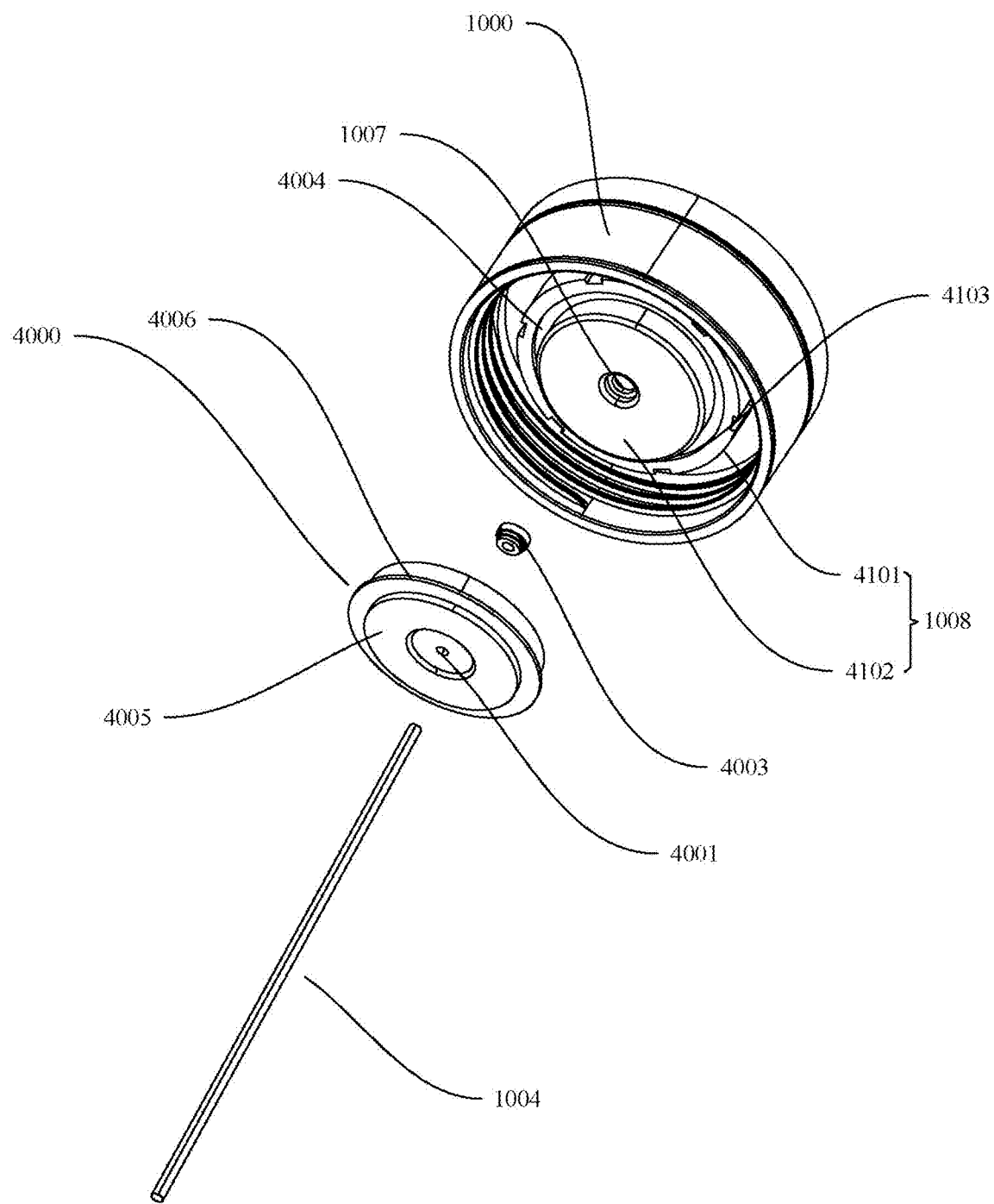
FIG. 9 is a schematic diagram of an exploded structure of connection between a lower cover plate and a cup cover main body of the present invention.
Figure 10:
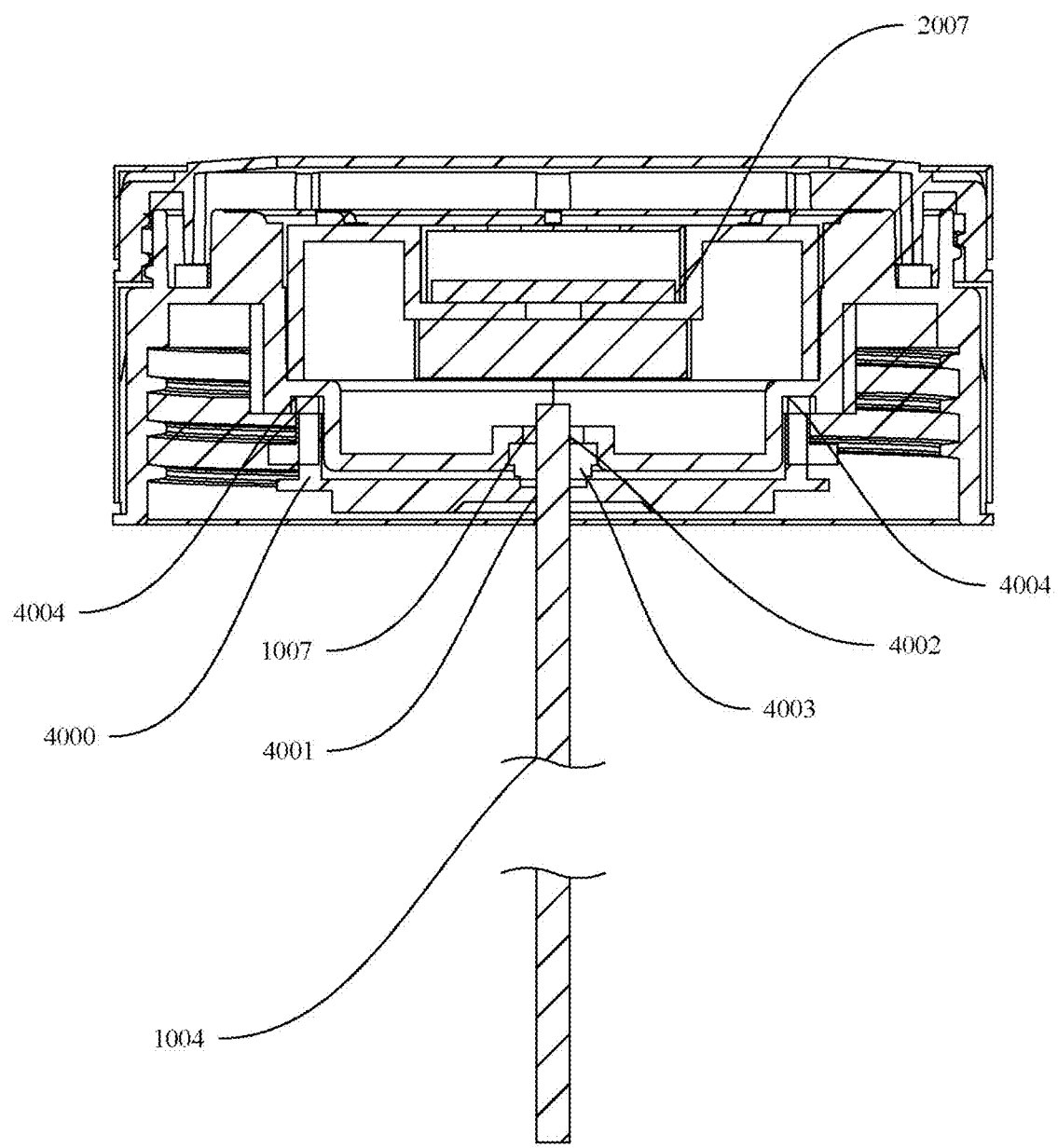
FIG. 10 is a schematic diagram of a cross-sectional structure of connection between a lower cover plate and a cup cover main body of the present invention.
Figure 11:
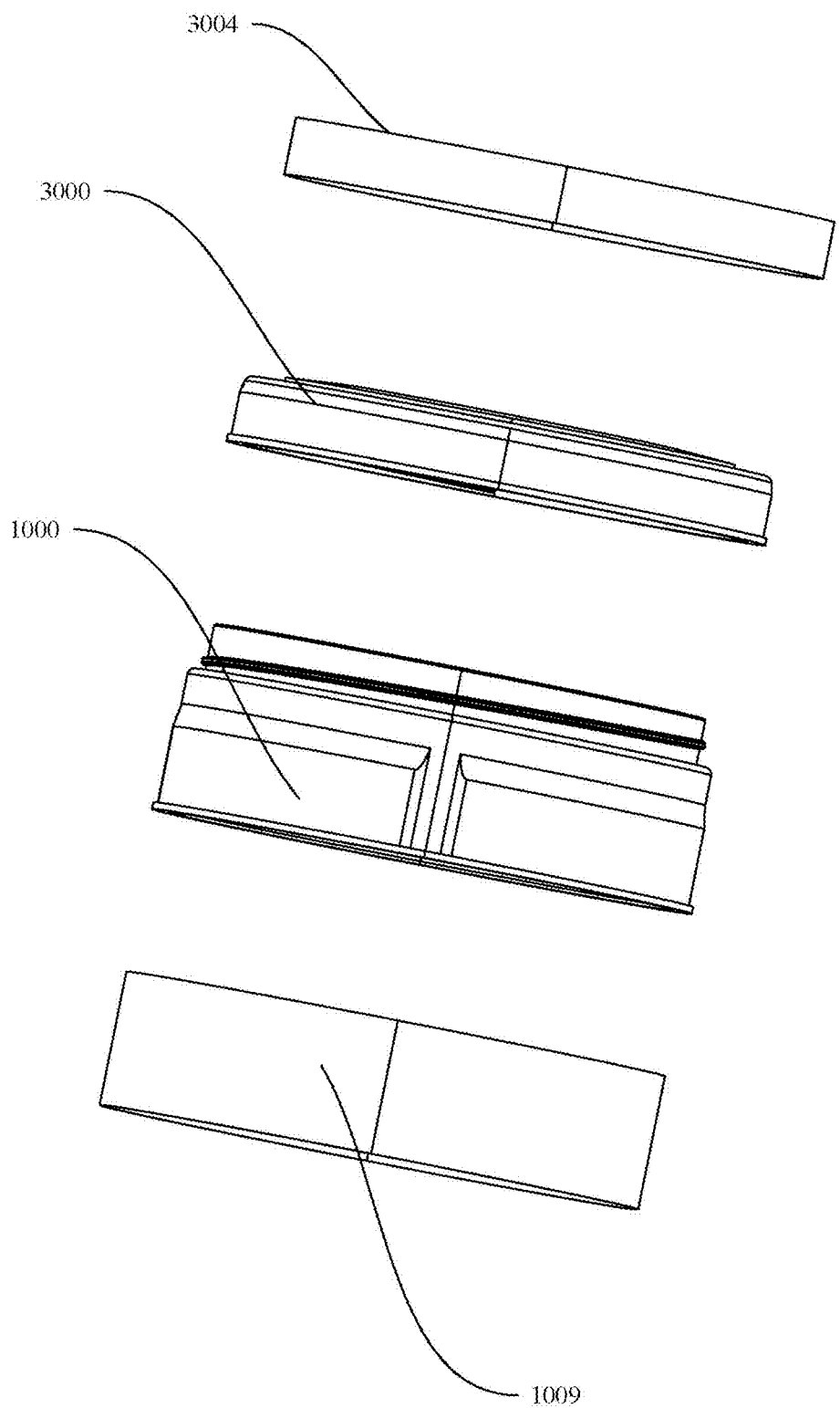
FIG. 11 is a schematic diagram of an exploded structure of a first decorative cover and a second decorative cover in the present invention.

In other embodiments, as shown in FIG. 6, a transparent display portion 3201 is provided on the central hole 3003. The transparent display portion 3201 is used for displaying temperature data measured by the temperature detection device 1002, and the transparent display portion 3201 is integrally formed with the upper cover 3000. By arranging the transparent display portion 3201 in the central hole 3003, direct visual display of the temperature data has been achieved, allowing the user to intuitively and conveniently read temperature information, and improving the user experience of the product. Moreover, the design of the transparent display portion 3201 being integrally formed with the upper cover 3000 reduces a total number of parts, and also reduces connection interfaces, thereby reducing potential failure points and improving the reliability and service life of the product.

In this embodiment, a first through hole 1007 is defined in a bottom end of the cup cover main body 1000. The first through hole 1007 is in communication with the accommodating cavity 1001 to allow the temperature detection probe 1004 to pass through the first through hole 1007 from an inner portion of the accommodating cavity 1001 and extend towards an outer portion of the cup cover main body 1000.

In this embodiment, the cup cover main body 1000 further includes a flange 1008 formed by a protruding portion of the accommodating cavity 1001. A bottom portion of the flange 1008 is provided with a lower cover plate 4000. A second through hole 4001 is defined in the lower cover plate 4000. The temperature detection probe 1004 is inserted into the second through hole 4001 and extends toward the outer portion of the cup cover main body 1000.

In this embodiment, a second gap 4002 is defined between the first through hole 1007 and the second through hole 4001. A second sealing ring 4003 is provided inside the second gap 4002 to seal the first through hole 1007, the second through hole 4001, and the temperature detection probe 1004. Through the above structure, the drug storage container cover of the present invention improves the accuracy of temperature detection, and enhances the stability and sealing of the structure of the drug storage container cover, thereby improving the user experience and safety of use.

In this embodiment, a sinking slot 4004 is defined in a bottom portion of the flange 1008. The lower cover plate 4000 is provided with a first installation portion 4005 and a second installation portion 4006. The second installation portion 4006 is integrally formed and connected with the first installation portion 4005. The first installation portion 4005 is a plastic installation portion, and the second installation portion 4006 is a stainless steel installation portion. The first installation portion 4005 is disposed in the sinking slot 4004, so that the lower cover plate 4000 is connected with the flange 1008.

Specifically, the flange 1008 includes a first step 4101 and a second step 4102 connected to the first step 4101. An installation platform 4103 is provided between the first step 4101 and the second step 4102. The sinking slot 4004 is provided on the installation platform 4103, so that the first installation portion 4005 is disposed inside the sinking slot 4004, and the lower cover plate 4000 is connected to the flange 1008. The tight connection between the sinking slot 4004 and the first installation portion 4005 improves the overall sealing performance, helps prevent liquid or gas leakage from a connection, and ensures the reliability and safety of the product.

In this embodiment, the first installation portion 4005 is ultrasonically welded in the sinking slot 4004, which can ensure that the connection between the lower cover plate 4000 and the flange 1008 is tight and reliable, so that the product has relatively high sealing performance.

In this embodiment, an outer side wall of the cup cover main body 1000 is also provided with a first decorative cover 1009. An outer side wall of the upper cover 3000 is provided with a second decorative cover 3004. Both the first decorative cover 1009 and the second decorative cover 3004 are metal decorative covers. The metal decorative covers usually have a bright appearance and texture, which can significantly enhance the overall aesthetics of the product. In this embodiment, the first decorative cover 1009 and the second decorative cover 3004 are respectively decorated on the cup cover main body 1000 and the upper cover 3000, making the entire drug storage container cover look more high-end and fashionable, meeting consumers' aesthetic needs for product appearance.

As a preferred option of this embodiment, a plastic ring is also provided between the upper cover 3000 and the second decorative cover 3004, which can effectively fill a small gap between the upper cover 3000 and the second decorative cover 3004 to prevent the infiltration of liquid, dust or other impurities, thereby protecting internal components from damage.

Figure 12:
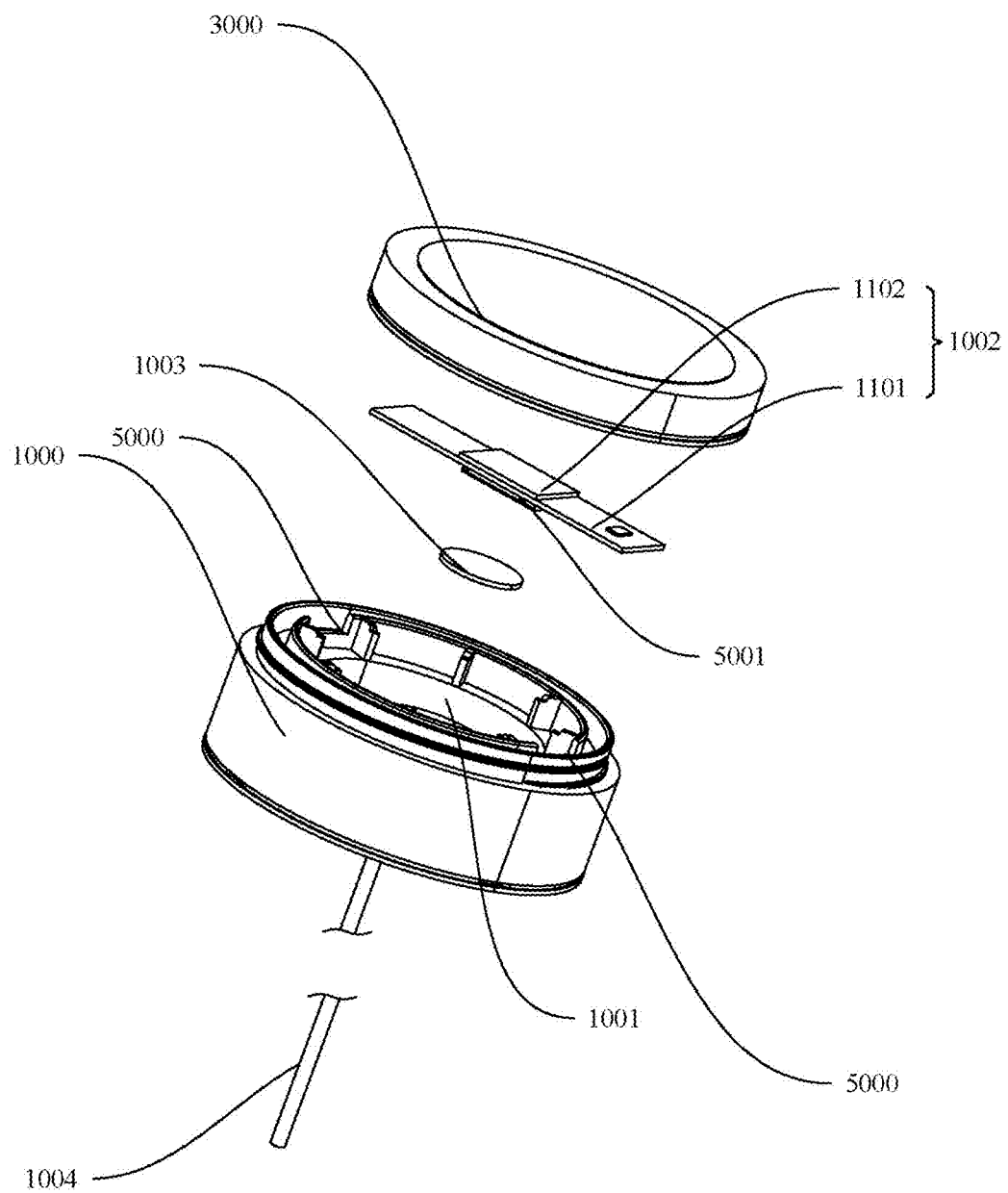
FIG. 12 is a schematic diagram of an overall structure of embodiment two of the present invention.

As a second embodiment of the present invention, referring to FIG. 12, a cavity wall of the accommodating cavity 1001 is provided with an installation slot opening 5000. The temperature display device 1002 is installed in the installation slot opening 5000. The temperature display device 1002 is equipped with an electrical compartment 5001, and the power supply device 1003 is installed inside the electrical compartment 5001, so that the power supply device 1003 is detachably connected to the temperature display device 1002. Specifically, a conductive plate is provided below the circuit board 1101 of the temperature display device 1002. Two ends of the conductive plate are welded to the circuit board 1101, and a middle part of the conductive plate is bent to form the electrical compartment 5001 that accommodates the power supply device 1003.

Figure 13:
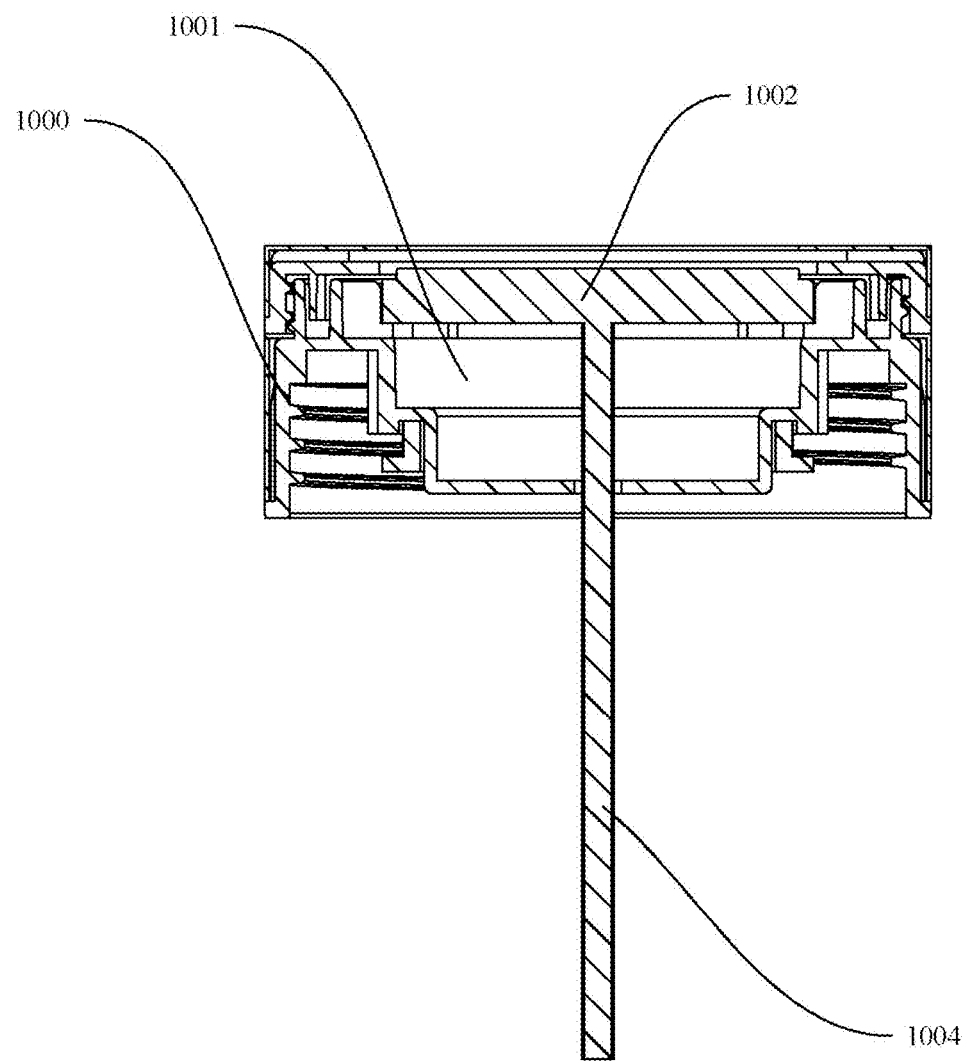
FIG. 13 is a schematic diagram of an overall structure of embodiment three of the present invention.

As a third embodiment of the present invention, referring to FIG. 13, the temperature display device 1002 is a thermometer display panel. The thermometer display panel is connected to the temperature detection probe 1004 to display a temperature value. The thermometer display panel is arranged in the accommodating cavity 1001, and the temperature detection probe 1004 is inserted into the accommodating cavity 1001 and extends towards the outer portion of the cup cover main body 1000 to measure a temperature inside a drug storage container.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A drug storage container cover with a temperature detection function, comprising:
    a cup cover main body, wherein the cup cover main body is provided with an accommodating cavity, a temperature display device and a power supply device are installed inside the accommodating cavity, and the power supply device is detachably connected to the temperature display device; and
    a temperature detection probe, wherein the temperature detection probe is arranged inside the accommodating cavity and extends towards an outer portion of the cup cover main body, and the temperature detection probe and the temperature display device are both electrically connected to the power supply device,
    wherein an installation seat is provided inside the accommodating cavity, the installation seat is provided with an installation chamber, and the temperature display device is installed inside the installation chamber;
    wherein the temperature display device comprises a circuit board and a display module electrically connected to the circuit board, and the power supply device is detachably connected to the circuit board;
    wherein the installation seat also comprises an installation slot, the installation slot is defined below the installation seat, and the power supply device is detachably installed in the installation slot and is electrically connected to the circuit board; and
    wherein a bottom portion of the installation seat is provided with at least two position limiting columns, one end of the position limiting column is connected to the bottom portion of the installation seat, an opposite end of the position limiting column is provided with a position limiting engaging block, at least two of the position limiting columns surround and form the installation slot, the position limiting engaging block is used for clamping the power supply device in the installation slot, and the position limiting column is an elastic position limiting column.

2. The drug storage container cover with the temperature detection function according to claim 1, wherein the bottom portion of the installation seat is also provided with at least one installation blocking plate, and the position limiting columns and the installation blocking plate surround and form the installation slot.

3. The drug storage container cover with the temperature detection function according to claim 2, wherein a plurality of clamping blocks are provided on a cavity wall of the accommodating cavity, and the clamping blocks are used for clamping the installation seat inside the accommodating cavity.

4. The drug storage container cover with the temperature detection function according to claim 3, wherein a display cover for displaying a temperature value is provided on the circuit board, and a first gap is defined between the display cover and the circuit board.

5. The drug storage container cover with the temperature detection function according to claim 4, wherein the first gap is filled with a colloid.

6. The drug storage container cover with the temperature detection function according to claim 1, wherein the drug storage container cover further comprises an upper cover detachably connected to the cup cover main body, the upper cover is connected to the cup cover main body to form a sealed cavity, and the temperature display device is installed inside the sealed cavity.

7. The drug storage container cover with the temperature detection function according to claim 1, wherein an outer side wall of the cup cover main body is also provided with a first decorative cover, an outer side wall of the upper cover is provided with a second decorative cover, and both the first decorative cover and the second decorative cover are metal decorative covers.

8. The drug storage container cover with the temperature detection function according to claim 1, wherein a cavity wall of the accommodating cavity is provided with an installation slot opening, the temperature display device is installed in the installation slot opening, the temperature display device is equipped with an electrical compartment, and the power supply device is installed inside the electrical compartment, so that the power supply device is detachably connected to the temperature display device.

9. A drug storage container cover with a temperature detection function, comprising:
  a cup cover main body, wherein the cup cover main body is provided with an accommodating cavity, a temperature display device and a power supply device are installed inside the accommodating cavity, and the power supply device is detachably connected to the temperature display device; and
  a temperature detection probe, wherein the temperature detection probe is arranged inside the accommodating cavity and extends towards an outer portion of the cup cover main body, and the temperature detection probe and the temperature display device are both electrically connected to the power supply device,
  wherein an installation seat is provided inside the accommodating cavity, the installation seat is provided with an installation chamber, and the temperature display device is installed inside the installation chamber;
  wherein the drug storage container cover further comprises an upper cover detachably connected to the cup cover main body, the upper cover is connected to the cup cover main body to form a sealed cavity, and the temperature display device is installed inside the sealed cavity; and
  wherein a first connecting portion is provided on an outer wall surface of the cup cover main body, a second connecting portion is provided on an inner wall surface of the upper cover, and the first connecting portion cooperates with the second connecting portion to allow the upper cover to be detachably connected to the cup cover main body.

10. The drug storage container cover with the temperature detection function according to claim 9, wherein the cup cover main body comprises a first outer side wall and a first inner side wall, a first groove is defined between the first outer side wall and the first inner side wall, the upper cover comprises a second outer side wall and a second inner side wall, a second groove is defined between the second outer side wall and the second inner side wall, the first connecting portion is provided on an outer wall surface of the first outer side wall, the second connecting portion is provided on an inner wall surface of the second outer side wall, the first outer side wall is provided in the second groove, and the second inner side wall is provided in the first groove, so that the first connecting portion and the second connecting portion cooperate to allow the upper cover to be detachably connected with the cup cover main body.

11. The drug storage container cover with the temperature detection function according to claim 10, wherein a first sealing ring is also provided between the second inner side wall and the first groove.

12. The drug storage container cover with the temperature detection function according to claim 11, wherein a central hole is defined in the upper cover, the installation seat is installed inside the sealed cavity and extends outward through the central hole, and an upper surface of the installation seat is flush with an upper surface of the upper cover.

13. The drug storage container cover with the temperature detection function according to claim 12, wherein a first through hole is defined in a bottom end of the cup cover main body, and the first through hole is in communication with the accommodating cavity to allow the temperature detection probe to pass through the first through hole from an inner portion of the accommodating cavity and extend towards an outer portion of the cup cover main body.

14. The drug storage container cover with the temperature detection function according to claim 13, wherein the cup cover main body further comprises a flange formed by a protruding portion of the accommodating cavity, a bottom portion of the flange is provided with a lower cover plate, a second through hole is defined in the lower cover plate, and the temperature detection probe is inserted into the second through hole and extends toward the outer portion of the cup cover main body.

15. The drug storage container cover with the temperature detection function according to claim 14, wherein a second gap is defined between the first through hole and the second through hole; and a second sealing ring is provided inside the second gap to seal the first through hole, the second through hole, and the temperature detection probe.

16. The drug storage container cover with the temperature detection function according to claim 14, wherein a sinking slot is defined in a bottom portion of the flange, the lower cover plate is provided with a first installation portion and a second installation portion, the second installation portion is connected with the first installation portion, the first installation portion is a plastic installation portion, the second installation portion is a stainless steel installation portion, and the first installation portion is disposed in the sinking slot, so that the lower cover plate is connected with the flange.

* * * * *